US011330163B2

(12) United States Patent
Chu

(10) Patent No.: US 11,330,163 B2
(45) Date of Patent: May 10, 2022

(54) EXCHANGING AN HDR-COMBINED STREAM AND ASSOCIATED EXPOSURES BETWEEN A CAMERA SENSOR MODULE AND A VISION PROCESSING SYSTEM

(71) Applicant: QUALCOMM Incorporated, San Diego, CA (US)

(72) Inventor: Jeffrey Hao Chu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 16/024,716

(22) Filed: Jun. 29, 2018

(65) Prior Publication Data

US 2020/0007738 A1    Jan. 2, 2020

(51) Int. Cl.
| | | |
|---|---|---|
| H04N 5/232 | (2006.01) | |
| G06T 7/80 | (2017.01) | |
| G06T 5/40 | (2006.01) | |
| H04N 5/235 | (2006.01) | |
| H04N 9/64 | (2006.01) | |
| G06T 5/50 | (2006.01) | |
| H04N 9/73 | (2006.01) | |

(52) U.S. Cl.
CPC .......... *H04N 5/23203* (2013.01); *G06T 5/40* (2013.01); *G06T 7/80* (2017.01); *H04N 5/2355* (2013.01); *H04N 9/646* (2013.01); *G06T 5/50* (2013.01); *G06T 2207/30248* (2013.01); *H04N 5/2353* (2013.01); *H04N 9/735* (2013.01)

(58) Field of Classification Search
CPC .. H04N 5/23203; H04N 9/646; H04N 5/2355; H04N 9/735; H04N 5/2353; G06T 5/40; G06T 7/80; G06T 2207/30248; G06T 5/50
See application file for complete search history.

(56) References Cited

U.S. PATENT DOCUMENTS

| | | |
|---|---|---|
| 8,958,658 B1 | 2/2015 | Lim et al. |
| 9,077,910 B2 | 7/2015 | Ninan et al. |
| 9,124,809 B2 | 9/2015 | Kaizu et al. |
| 9,160,936 B1 * | 10/2015 | Rivard ................. H04N 5/2355 |
| 9,210,322 B2 | 12/2015 | Ninan et al. |
| 9,626,760 B2 | 4/2017 | Narahari et al. |

(Continued)

FOREIGN PATENT DOCUMENTS

WO    2016191437 A1    12/2016

OTHER PUBLICATIONS

International Search Report and Written Opinion—PCT/US2019/038920—ISA/EPO—dated Sep. 12, 2019.

*Primary Examiner* — Timothy J Henn
*Assistant Examiner* — Angel L Garces-Rivera
(74) *Attorney, Agent, or Firm* — Qualcomm Incorporated

(57) ABSTRACT

In an embodiment, a camera sensor module is communicatively coupled to a vision processing system. The camera sensor module captures a plurality of exposures, produces an HDR-combined stream, and sends both the HDR-combined stream and the plurality of exposures to the vision processing system. A first ISP of the vision processing system performs color processing to produce a color-processed HDR-combined stream for neural network processing, presentation to a human, and/or computer vision processing. At least one other ISP of the vision processing system performs color processing to collect exposure-specific statistics on at least one of the plurality of exposures for determining camera calibration data for the camera sensor module.

43 Claims, 12 Drawing Sheets

(56) References Cited

U.S. PATENT DOCUMENTS

| | | |
|---|---|---|
| 2013/0061235 A1 | 3/2013 | Gargash et al. |
| 2015/0244918 A1 | 8/2015 | Svensson et al. |
| 2015/0341620 A1 | 11/2015 | Han et al. |
| 2017/0280038 A1 | 9/2017 | Ai et al. |
| 2017/0293811 A1* | 10/2017 | Zhai .................... G06K 9/3233 |
| 2018/0285301 A1* | 10/2018 | Thanigasalam ..... G06F 13/4027 |

* cited by examiner

EXCHANGING AN HDR-COMBINED STREAM AND ASSOCIATED EXPOSURES BETWEEN A CAMERA SENSOR MODULE AND A VISION PROCESSING SYSTEM

BACKGROUND

Embodiments relate to exchanging a high-dynamic range (HDR)-combined stream between a camera sensor module and a vision processing system.

Typical camera sensors found in consumer applications such as phones and tablet computers output a single exposure per frame time, typically 10-14 bits per pixel. Camera sensors may be designed and configured to capture multiple exposures per frame time, whereby multiple exposures can be combined/merged together to form a high dynamic range (HDR) image stream. For example, wide or ultra-HDR sensors achieving at least 120 dB may be used for object detection in automotive systems, whereby an HDR image stream (e.g., 20-24 bits or lower, depending on whether companding is used) of at least 120 dB may be achieved via the merge of multiple (e.g., 3 or 4) such exposures.

In certain camera implementations, such as automotive systems, one or more camera sensors may be arranged separately from a vision processing system that performs various processing on the image data captured by the one or more camera sensors. Image signal processors (ISPs) of some vision processing systems do not support HDR-combining, in which case the HDR-combining may be performed by an on-sensor processing system integrated with each respective camera sensor, with the on-sensor processing system providing the HDR-combined stream of images to the vision processing system.

In systems where HDR-combining is performed by on-sensor processing systems integrated with the respective camera sensors, it is difficult to obtain individual exposure-specific statistics (e.g., exposure histograms, etc.) for calibrating the respective camera sensors. In particular, exposure-level information is lost when the exposures are merged to form the HDR-combined stream of images. Alternatively, the exposure-level information may be extracted by the integrated on-sensor processing systems, but this increases the costs and complexity of the camera sensors.

SUMMARY

An embodiment is directed to a method of operating a camera sensor module that is communicatively coupled to a vision processing system, including capturing a plurality of exposures, performing high-dynamic range (HDR) combining on the plurality of exposures to produce an HDR-combined stream, and communicating, over a communications link to the vision processing system, (i) the HDR-combined stream, and (ii) the plurality of exposures.

Another embodiment is directed to a method of operating a vision processing system that is communicatively coupled to a camera sensor module, including receiving, from the camera sensor module over a communications link, (i) a plurality of exposures captured by the camera sensor module, and (ii) a high-dynamic range (HDR)-combined stream of the plurality of exposures based on HDR-combining performed at the camera sensor module, performing, by a first image signal processor (ISP) among a plurality of ISPs, color processing on the HDR-combined stream to produce a color-processed HDR-combined stream for neural network processing, presentation to a human, and/or computer vision processing, and performing, by at least one other ISP among the plurality of ISPs, color processing to collect exposure-specific statistics on at least one of the plurality of exposures for determining camera calibration data for the camera sensor module.

Another embodiment is directed to a camera sensor module that is communicatively coupled to a vision processing system, including means for capturing a plurality of exposures, means for performing high-dynamic range (HDR) combining on the plurality of exposures to produce an HDR-combined stream, and means for communicating, over a communications link to the vision processing system, (i) the HDR-combined stream, and (ii) the plurality of exposures.

Another embodiment is directed to a vision processing system that is communicatively coupled to a camera sensor module, including means for receiving, from the camera sensor module over a communications link, (i) a plurality of exposures captured by the camera sensor module, and (ii) a high-dynamic range (HDR)-combined stream of the plurality of exposures based on HDR-combining performed at the camera sensor module, means for performing, by a first image signal processor (ISP) among a plurality of ISPs, color processing on the HDR-combined stream to produce a color-processed HDR-combined stream for neural network processing, presentation to a human, and/or computer vision processing, and means for performing, by at least one other ISP among the plurality of ISPs, color processing to collect exposure-specific statistics on at least one of the plurality of exposures for determining camera calibration data for the camera sensor module.

Another embodiment is directed to a camera sensor module that is communicatively coupled to a vision processing system, including a camera sensor configured to capture a plurality of exposures, an on-sensor processing system configured to perform high-dynamic range (HDR) combining on the plurality of exposures to produce an HDR-combined stream, and a communications interface configured to communicate, over a communications link to the vision processing system, (i) the HDR-combined stream, and (ii) the plurality of exposures.

Another embodiment is directed to a vision processing system that is communicatively coupled to a camera sensor module, including a communications interface configured to receive, from the camera sensor module over a communications link, (i) a plurality of exposures captured by the camera sensor module, and (ii) a high-dynamic range (HDR)-combined stream of the plurality of exposures based on HDR-combining performed at the camera sensor module, a first image signal processor (ISP) among a plurality of ISPs, the first ISP configured to perform color processing on the HDR-combined stream to produce a color-processed HDR-combined stream for neural network processing, presentation to a human, and/or computer vision processing, and at least one other ISP among the plurality of ISPs, the at least one other ISP configured to perform color processing to collect exposure-specific statistics on at least one of the plurality of exposures for determining camera calibration data for the camera sensor module.

Another embodiment is directed to a non-transitory computer-readable medium containing instructions stored thereon, which, when executed by a camera sensor module that is communicatively coupled to a vision processing system, cause the camera sensor module to perform operations, the operations including at least one instruction to cause the camera sensor module to capture a plurality of exposures, at least one instruction to cause the camera sensor module to perform high-dynamic range (HDR) combining on the plurality of exposures to produce an HDR-combined stream, and at least one instruction to cause the camera sensor module to communicate, over a communications link to the vision processing system, (i) the HDR-combined stream, and (ii) the plurality of exposures.

Another embodiment is directed to a non-transitory computer-readable medium containing instructions stored thereon, which, when executed by a vision processing system that is communicatively coupled to a camera sensor module, cause the vision processing system to perform operations, the operations including at least one instruction to cause the vision processing system to receive, from the camera sensor module over a communications link, (i) a plurality of exposures captured by the camera sensor module, and (ii) a high-dynamic range (HDR)-combined stream of the plurality of exposures based on HDR-combining performed at the camera sensor module, at least one instruction to cause a first image signal processor (ISP) among a plurality of ISPs of the vision processing system to perform color processing on the HDR-combined stream to produce a color-processed HDR-combined stream for neural network processing, presentation to a human, and/or computer vision processing, and at least one instruction to cause at least one other ISP among the plurality of ISPs of the vision processing system to perform color processing to collect exposure-specific statistics on at least one of the plurality of exposures for determining camera calibration data for the camera sensor module.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Aspects of the disclosure are disclosed in the following description and related drawings directed to specific example embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." All of the embodiments described herein are intended as exemplary, and no specific embodiment is necessarily intended to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
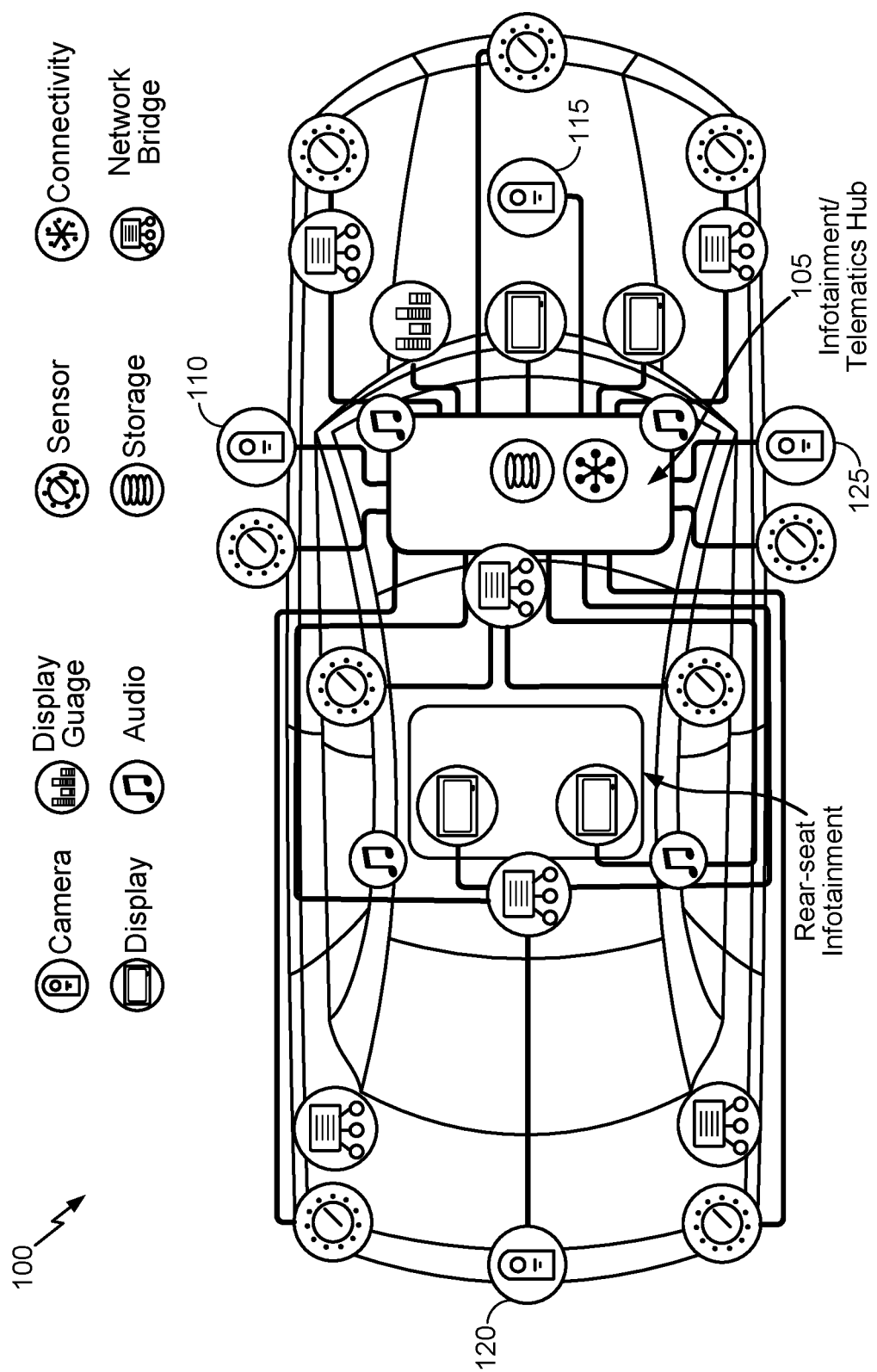
FIG. 1 illustrates a system control diagram of a vehicle in accordance with an embodiment of the disclosure.

FIG. 1 illustrates a system control diagram of a vehicle 100 in accordance with an embodiment of the disclosure. In FIG. 1, the vehicle 100 includes an infotainment/telematics hub 105 that is connected via cabling to various peripheral devices, such as camera sensor modules 110-125. Other peripheral devices to which the infotainment/telematics hub 105 is connected include a display gauge, audio devices (e.g., speakers, etc.), a storage device, a network bridge, and so on.

Figure 2:
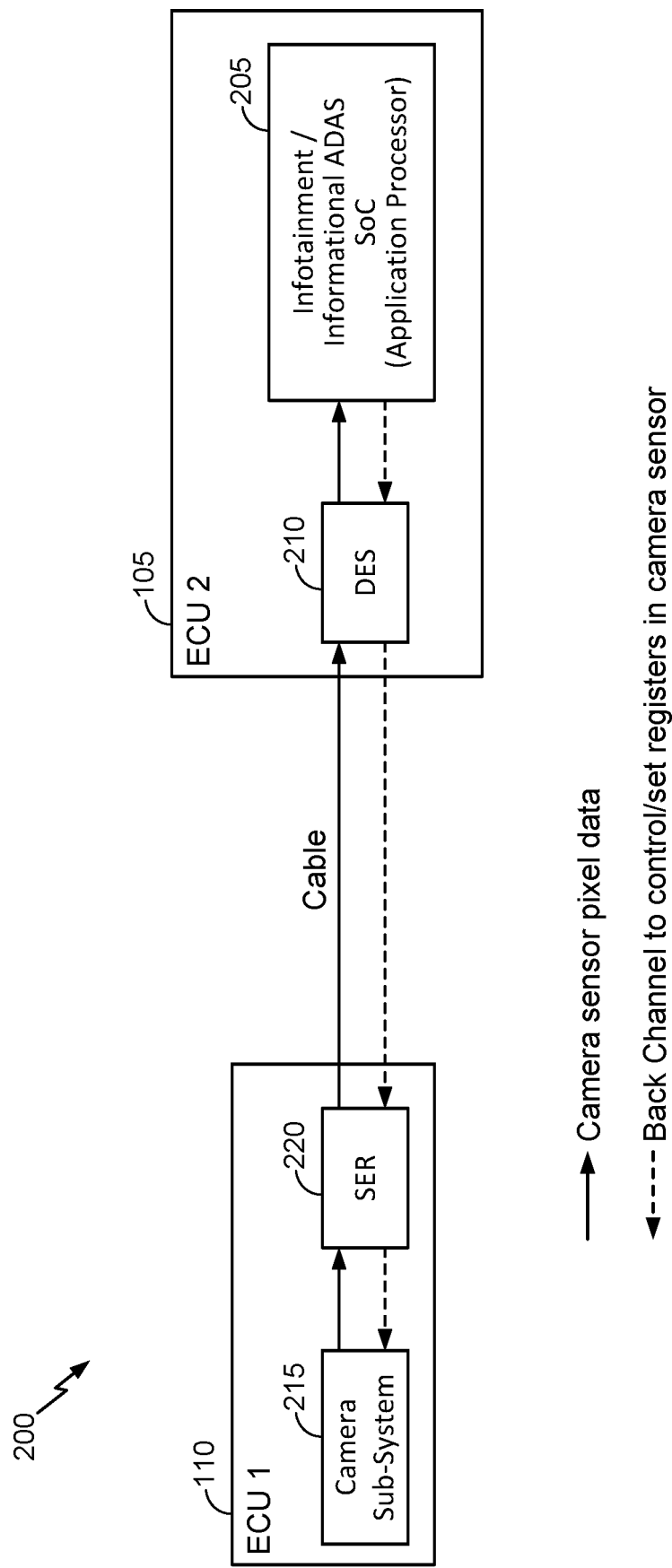
FIG. 2 illustrates a system depicting components of and interconnections between an infotainment/telematics hub and a camera sensor module in accordance with another embodiment of the disclosure.

FIG. 2 illustrates a system 200 depicting components of and interconnections between the infotainment/telematics hub 105 and the camera sensor module 110 of FIG. 1 in accordance with another embodiment of the disclosure. Referring to FIG. 2, the infotainment/telematics hub 105 and the camera sensor module 110 are physically separate from each other and correspond to separate electronic control units (ECUs). The infotainment/telematics hub 105 includes an application processor system 205 and a deserializer (DES) 210. The camera sensor module 110 includes a camera sub-system 215 and a serializer (SER) 220. The camera sub-system 215 includes a camera sensor and an integrated on-sensor processing system. The DES 210 and SER 220 are physically wired or cabled to each other. Generally, the camera sensor module 110 sends camera sensor pixel data (e.g., HDR-combined stream) to the infotainment/telematics hub 105, and the infotainment/telematics hub 105 sends control/set registers back to the camera sensor module 110 for calibration.

Figure 3:
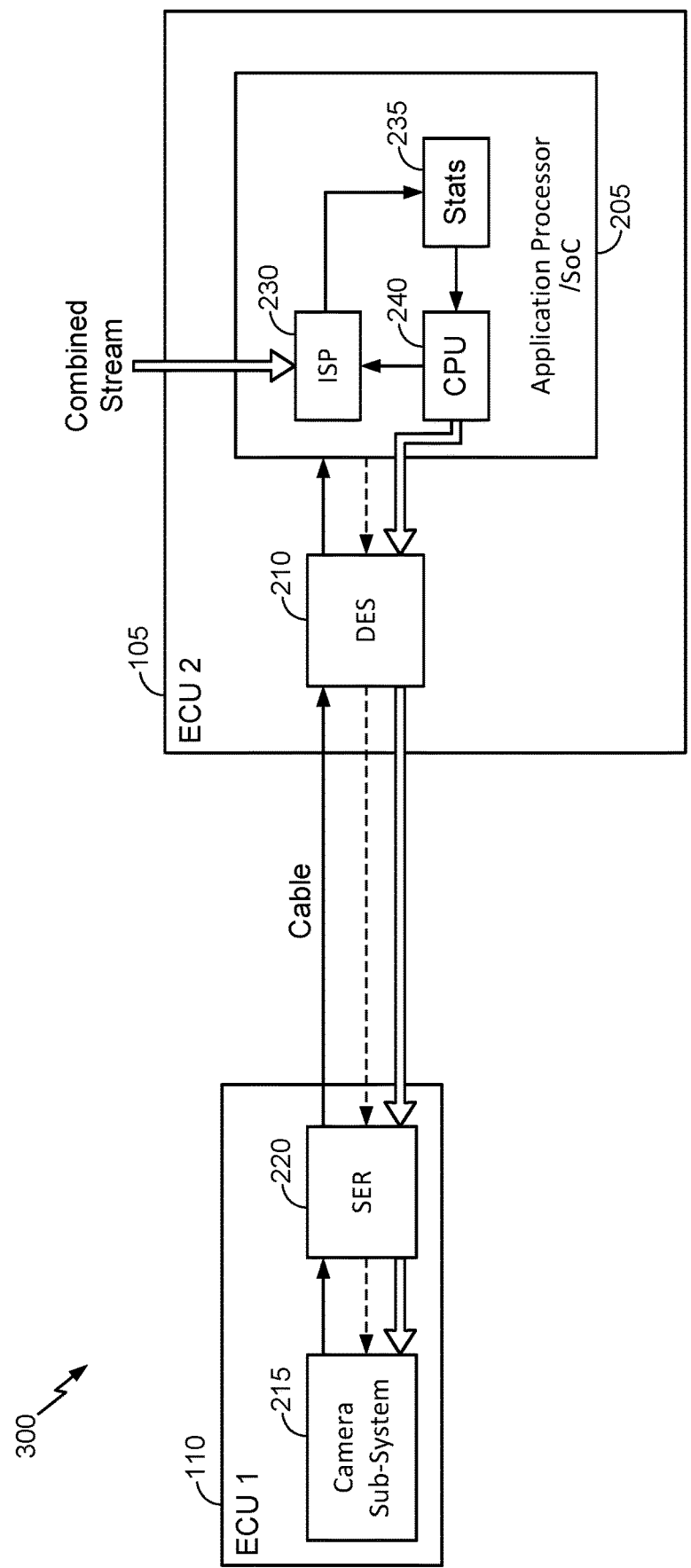
FIG. 3 illustrates a system depicting components of and interconnections between an infotainment/telematics hub and a camera sensor module in accordance with another embodiment of the disclosure.

FIG. 3 illustrates a system 300 depicting components of and interconnections between the infotainment/telematics hub 105 and the camera sensor module 110 of FIG. 1 in accordance with another embodiment of the disclosure. The system 300 is a more detailed perspective of the system 200 of FIG. 2.

Referring to FIG. 3, the camera sensor module 110 generates an HDR-combined stream which is sent to the infotainment/telematics hub 105 and delivered to an image signal processor (ISP) 230. The ISP 230 performs color processing on the HDR-combined stream to produce a color-processed HDR-combined stream for downstream processing (e.g., neural network processing, presentation to a human, and/or computer vision processing, etc.). The color processing performed by the ISP 230 may include conversion of Bayer RGB to RGB (i.e. demosaicing), bad pixel correction, noise filtering, tone mapping, or any combination thereof. Statistics 235 are extracted from the color-processed HDR-combined stream. However, these statistics are not exposure-specific statistics, as any exposure-level information is lost due to the merging of the exposures into the HDR-combined stream at the camera sensor module 110. Hence, the statistics extracted by the statistics module 235 may be referred to as "combined stream" statistics. A central processing unit (CPU) 240 processes the combined stream statistics and generates settings adjustments for the camera sensor module 110, such as automatic exposure (AE) control settings and/or automatic white-balance (AWB) control settings, which are sent to the camera sensor module 110 and/or ISP 230 for camera sensor calibration. While FIG. 3 illustrates the statistics 235 as separate from the ISP 230, the statistics 235 may be produced by the ISP 230.

Figure 4:
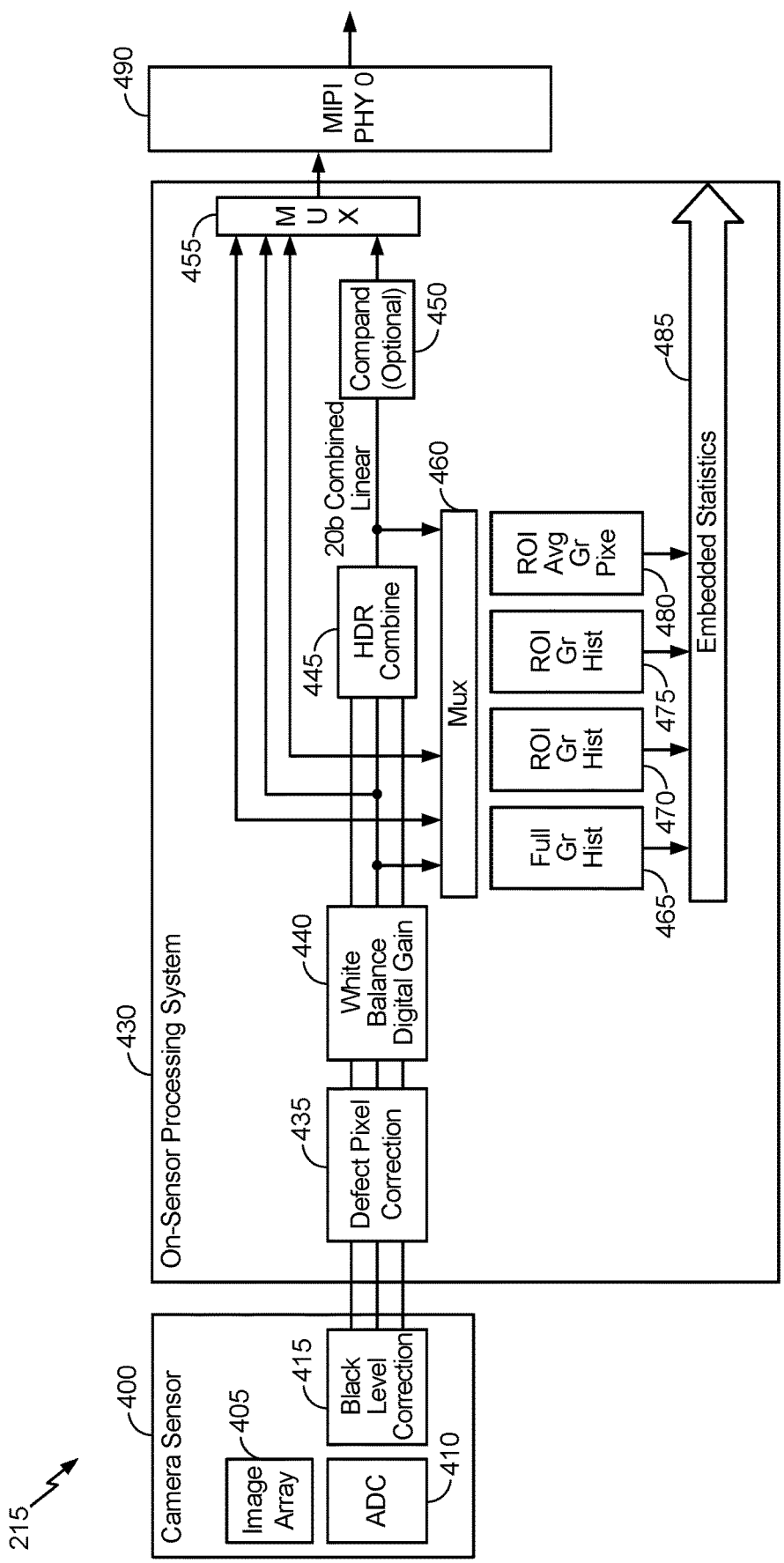
FIG. 4 illustrates an example of a camera sub-system of a camera sensor module.

FIG. 4 illustrates an example of the camera sub-system 215 of the camera sensor module 110 of FIGS. 2-3 in more detail. The camera sub-system 215 includes a camera sensor 400 and an on-sensor processing system 430. The camera sensor 400 includes an image array 405, an analog to digital converter (ADC) 410 and a black level correction module 415. The image array 405 may consist of a two dimensional array of photo-diodes to capture "pixels". The ADC 410 is used to convert the pixel analog value to a discrete digital valaue. Black level correction module 415 may be enabled to compensate for dark current or lens flare and ensure black is perceived as black. The on-sensor processing system 430 includes a defect pixel correction module 435, a white balance digital gain module 440, an HDR-combine module 445, an optional companding module 450 and a multiplexer 455. Defect pixel correction module 435 may be enabled to replace or substitute an anomalous pixel capture resulting from a sensor manufacturing defect. The white balance digital gain module 440 can be enabled to apply adjustment on pixel values. The HDR-combine module 445 enables an algorithm to take multiple exposures within a frame time and produce a single frame output for image processing. The on-sensor processing system 430 further includes hardware related to statistics collection, such as multiplexer 460, a full image histogram module 465, user configurable region of interest (ROI) histogram modules 470 and 475, ,and a user configurable ROI Average Pixel module 480, which outputs statistics 485. Also shown in FIG. 4 is a physical layer interface 490, or PHY. In particular, the PHY 490 is a Mobile Industry Processor Interface (MIPI) PHY, such as a MIPI C-PHY or MIPI D-PHY. The camera sub-system 215 depicted in FIG. 4 may be configured to output a 20b linear HDR-combined stream along with single exposure specific statistics or combined stream statistics. It will be appreciated that the modules 465-480 are part of a color filter array specific to green pixels. In other embodiments, the modules 465-480 may be configured to collect data on other pixel colors, such as red blue, white, clear and so on.

Figure 5:
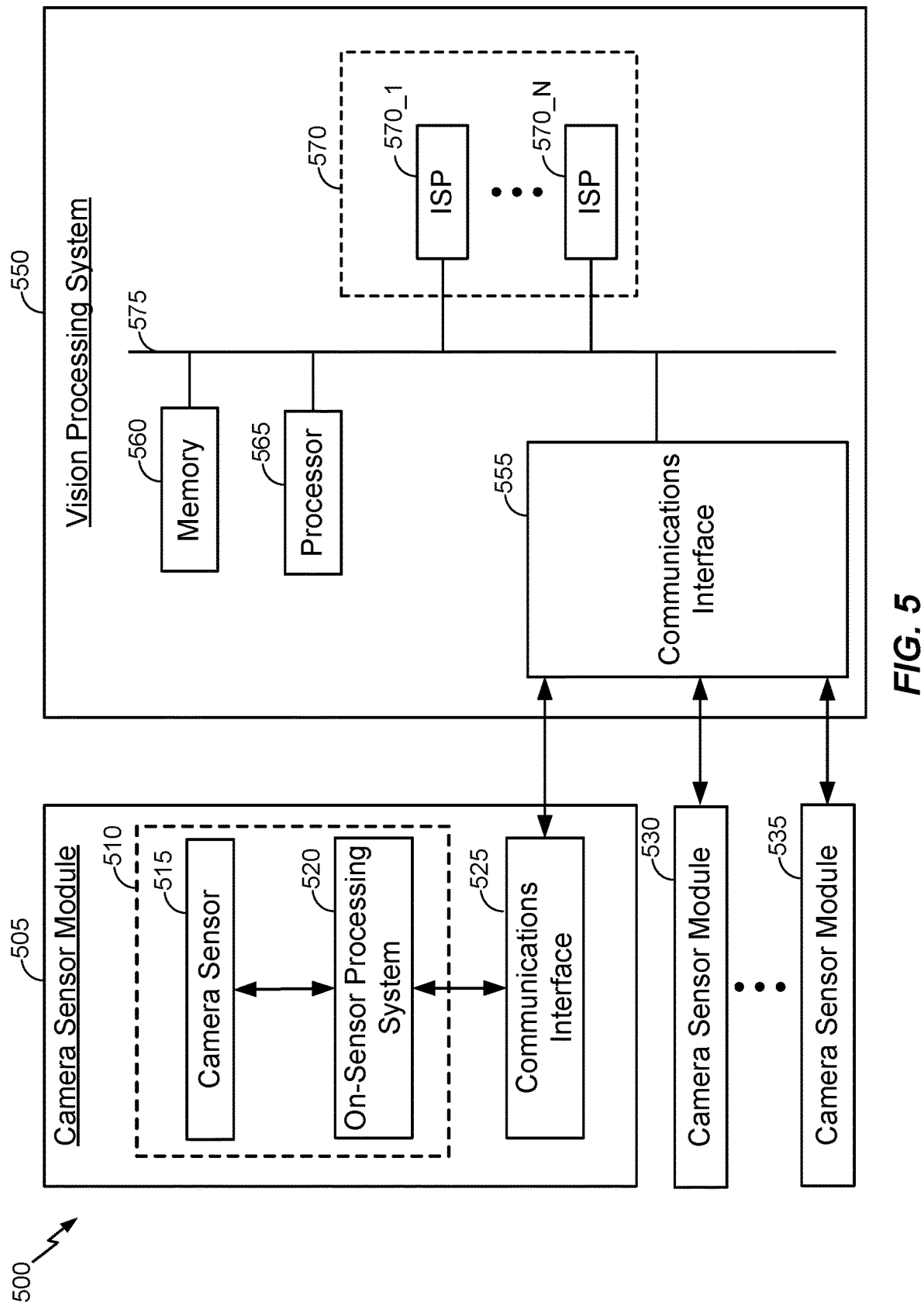
FIG. 5 illustrates an image capture system in accordance with an embodiment of the disclosure.

FIG. 5 illustrates an image capture system 500 in accordance with an embodiment of the disclosure. Referring to FIG. 5, the image capture system 500 includes a camera sensor module 505 and a vision processing system 550. The camera sensor module 505 includes a camera sub-system 510 containing a camera sensor 515 and an on-sensor processing system 520, and a communications interface 525. One or more optional camera sensor modules 530 and 535 may also be included as part of the image capture system 500 (e.g., for an automotive deployment as shown in FIG. 1). Each of the optional camera sensor modules 530-535 may be configured similarly to the camera sensor module 505.

Referring to FIG. 5, the vision processing system 550 includes a communications interface 555, a memory 560, a processor 565 (e.g., a CPU), an ISP sub-system 570. The ISP sub-system 570 includes a plurality of ISPs 570_1 . . . 570_N, whereby N is greater than or equal to 2. The various components of the vision processing system 550 communicate with each other over a bus 575.

In an example, the image capture system 500 of FIG. 5 may be deployed with respect to a vehicle as in FIG. 1, whereby the camera sensor module 505 and the vision processing system 550 are physically separate from each other. However, it is also possible for the image capture system 500 of FIG. 5 to be self-contained in a single apparatus, such as a phone or tablet computer. Accordingly, the various embodiments of the disclosure are not limited to automotive deployments.

Figure 6:
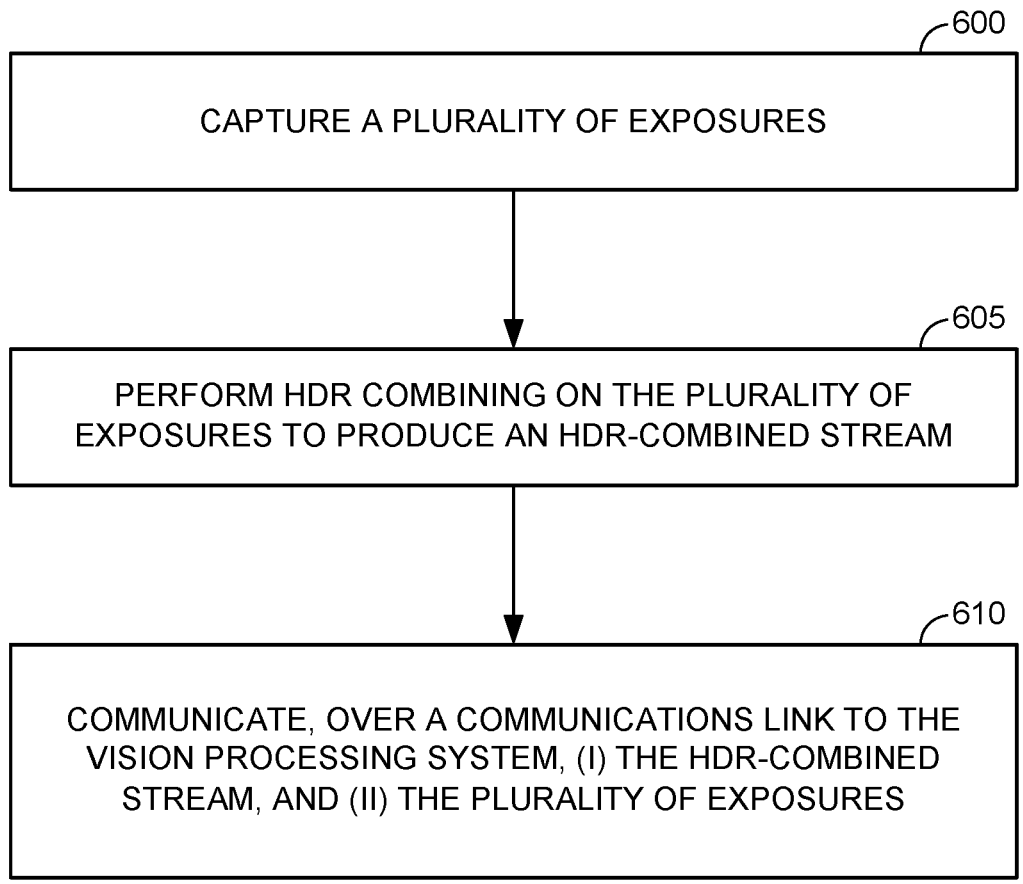
FIG. 6 illustrates an HDR-combining process in accordance with an embodiment of the disclosure.

FIG. 6 illustrates an HDR-combining process in accordance with an embodiment of the disclosure. In an example, the process of FIG. 6 is performed by the camera sensor module 505 of the image capture system 500 of FIG. 5.

Referring to FIG. 6, at block 600, the camera sensor 515 of the camera sensor module 505 captures a plurality of exposures (e.g., a set of 3 or 4 exposures captured within a threshold period of time of each other). At block 605, the on-sensor processing system 520 of the camera sensor module 505 performs HDR-combining on the plurality of exposures to produce an HDR-combined stream (e.g., at least 120 dB). At block 610, the communications interface 525 of the camera sensor module 505 communicates, over a communications link to the vision processing system 550, the (i) HDR-combined stream and (ii) the plurality of exposures. As will be appreciated, block 610 is distinct from an implementation whereby the HDR-combined stream is transferred to a vision processing system (with or without exposure-specific statistics) due to the further inclusion of the plurality of exposures being transferred as well. In an example, the communications link between the camera sensor module 505 and the vision processing system 550 can correspond to physical cabling (e.g., a MIPI PHY). In another example, the communications link between the camera sensor module 505 and the vision processing system 550 can correspond to an internal bus (e.g., for a phone or tablet computer implementation).

Figure 7:
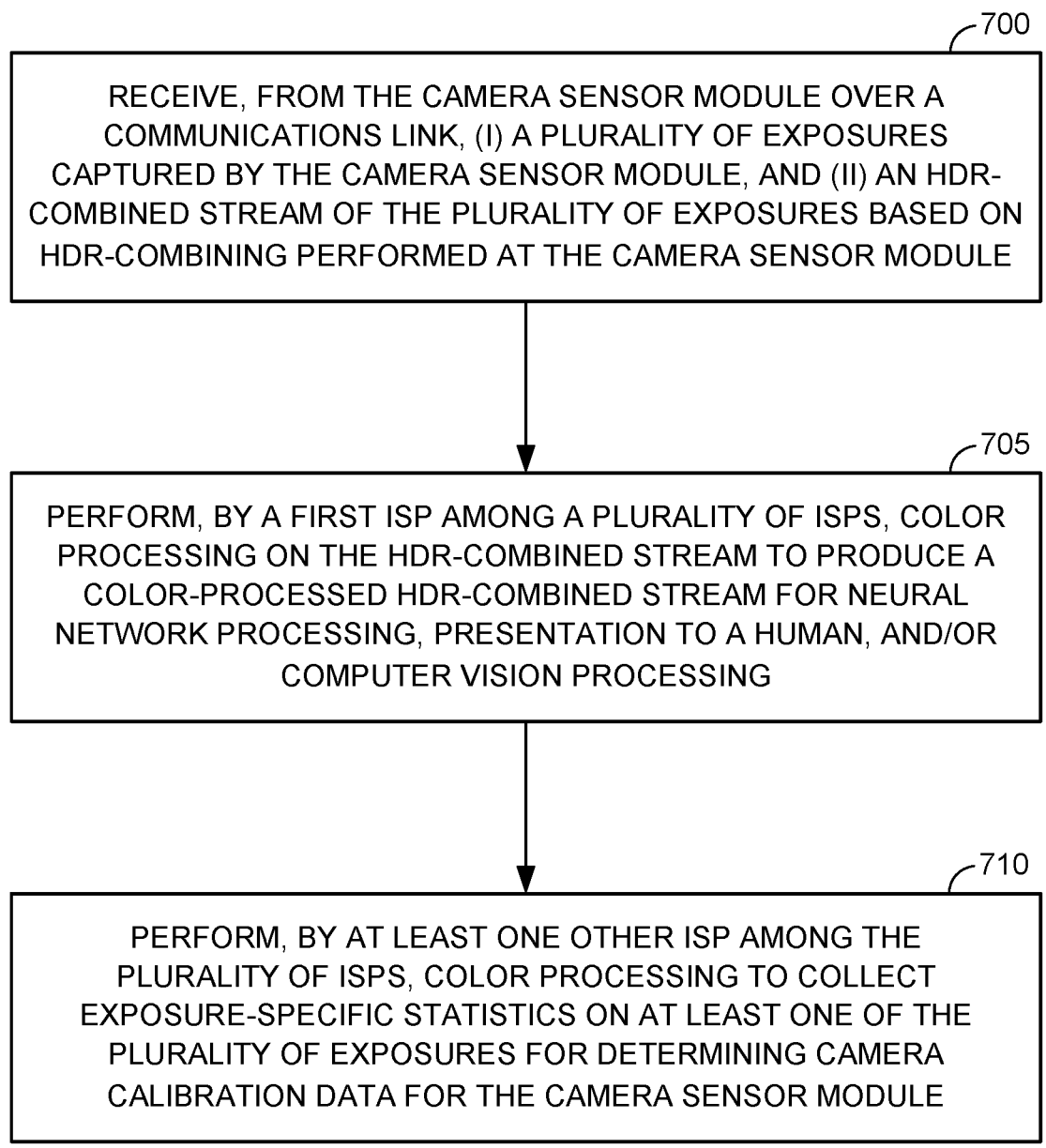
FIG. 7 illustrates an exposure-specific statistic gathering process in accordance with an embodiment of the disclosure.

FIG. 7 illustrates an exposure-specific statistic gathering process in accordance with an embodiment of the disclosure. In an example, the process of FIG. 7 is performed by the vision processing system 550 of the image capture system 500 of FIG. 5.

Referring to FIG. 7, at block 700, the communications interface 555 of the vision processing system 550 receives, from the camera sensor module 505 over a communications link, (i) a plurality of exposures captured by the camera sensor module 505, and (ii) an HDR-combined stream of the plurality of exposures based on HDR-combining performed at the camera sensor module 505. For example, block 700 may result from block 610 of FIG. 6.

Referring to FIG. 7, at block 705, a first ISP (e.g., ISP 570_1) of the ISP sub-system 570 performs color processing on the HDR-combined stream to produce a color-processed HDR-combined stream for downstream processing (e.g., neural network processing, presentation to a human, and/or computer vision processing, etc.). The color processing performed by the ISP 570_1 may include conversion of Bayer RGB to RGB (i.e. demosaicing), bad pixel correction, noise filtering, tone mapping, and so on.

Referring to FIG. 7, at block 710, at least one other ISP (e.g., one or more of ISPs 570_2 ... 570_N) performs color processing to collect exposure-specific statistics on at least one of the plurality of exposures for determining camera calibration data for the camera sensor module. As will be appreciated, the statistics collected at block 710 are exposure-specific statistics and not combined stream statistics. Of course, combined stream statistics can also be collected based on the color-processed HDR-combined stream produced by the first ISP at block 705.

Figure 8:
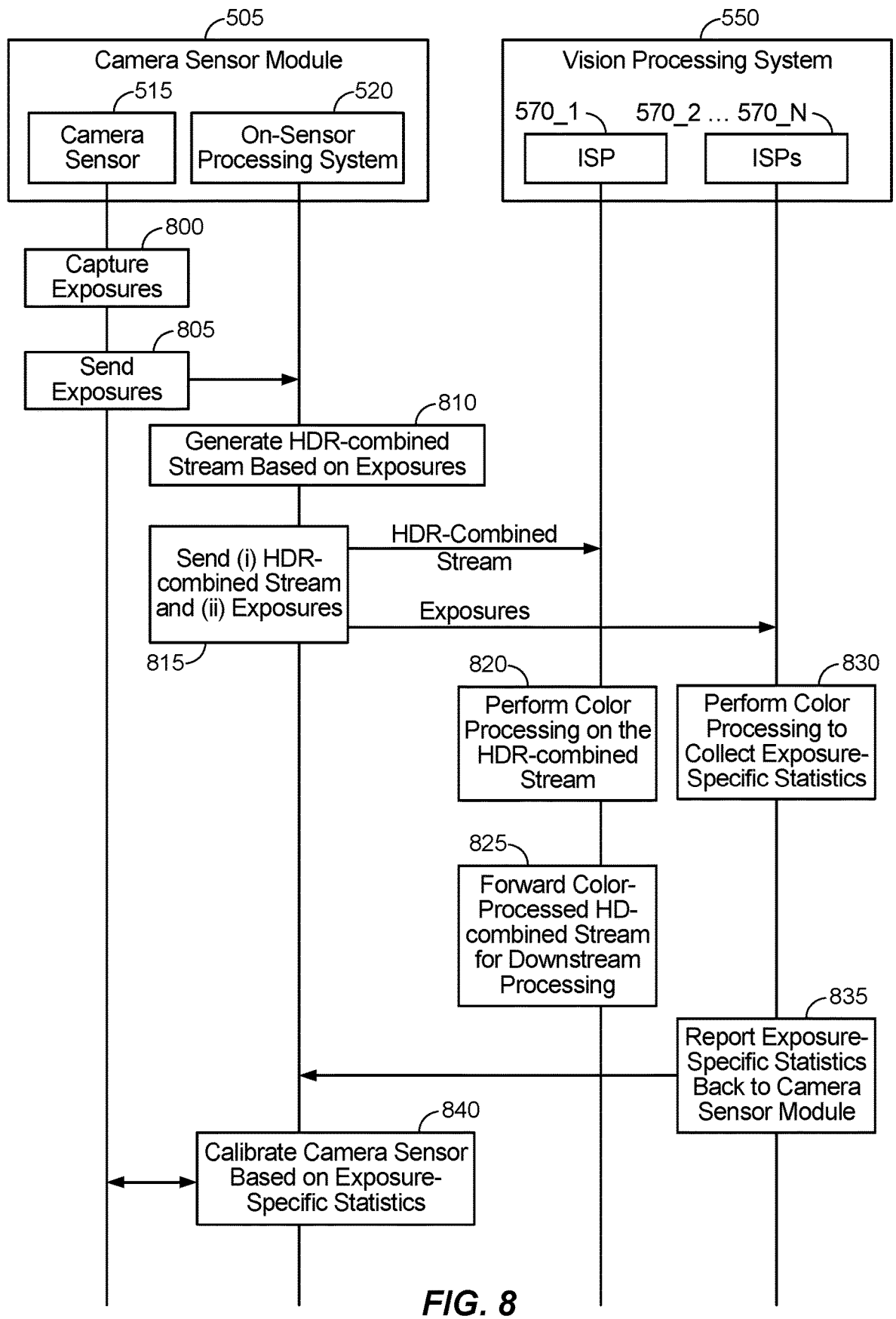
FIG. 8 illustrates an example implementation of the processes of FIGS. 6-7 by the image capture system of FIG. 5 in accordance with an embodiment of the disclosure.

FIG. 8 illustrates an example implementation of the processes of FIGS. 6-7 by the image capture system 500 of FIG. 5 in accordance with an embodiment of the disclosure.

Referring to FIG. 8, at block 800 (e.g., as in block 600 of FIG. 6), the camera sensor 515 of the camera sensor module 505 captures a plurality of exposures (e.g., a set of 3 or 4 exposures captured within a threshold period of time of each other). At block 805, the camera sensor 515 sends the captured exposures to the on-sensor processing system 520. At block 810 (e.g., as in block 605 of FIG. 6), the on-sensor processing system 520 of the camera sensor module 505 performs HDR-combining on the plurality of exposures to produce an HDR-combined stream (e.g., at least 120 dB). At block 815 (e.g., as in block 610 of FIG. 6 and block 700 of FIG. 7), the camera sensor module 505 communicates (e.g., via the communications interface 525), over a communications link to the vision processing system 550, the (i) HDR-combined stream and (ii) the plurality of exposures. In particular, the HDR-combined stream is delivered to ISP 570_1, while the exposures are delivered to ISPs 570_2 ... 570_N (e.g., whereby N may be equal to 2 or greater than 2, as will be described below in more detail).

Referring to FIG. 8, at block 820 (e.g., as in block 705 of FIG. 7), ISP 570_1 performs color processing on the HDR-combined stream to produce a color-processed HDR-combined stream. At block 825, ISP 570_1 forwards the color-processed HD-combined stream for downstream processing (e.g., neural network processing, presentation to a human, and/or computer vision processing, etc.).

Referring to FIG. 8, at block 830 (e.g., as in block 710 of FIG. 7), one or more of ISPs 570_2 ... 570_N) performs color processing to collect statistics on at least one of the plurality of exposures for determining camera calibration data for the camera. At block 835, the vision processing system 550 reports the exposure-specific statistics collected at block 830 back to the camera sensor module 505, which then calibrates the camera sensor 515 based on the exposure-specific statistics at block 840. As an alternative to block 835, the vision processing system 550 may instead compute and send the camera sensor calibration parameters (e.g., AE and/or AWB control settings). So, the component that converts the exposure-specific statistics into camera sensor calibration parameters may be flexibly implemented.

Figure 9:
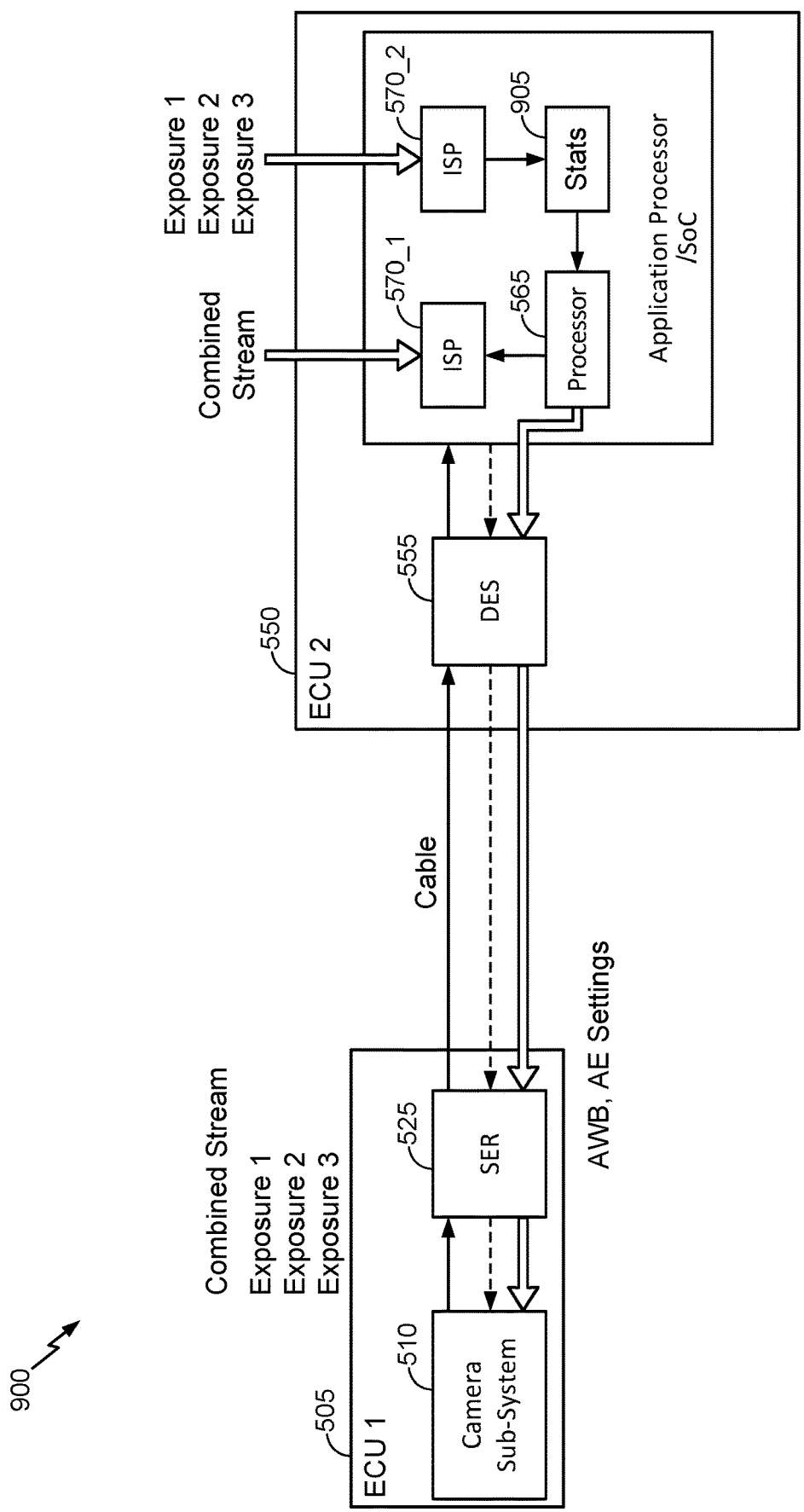
FIG. 9 illustrates a dual-ISP configuration of a portion of the image capture system of FIG. 5 in accordance with another embodiment of the disclosure.

FIG. 9 illustrates a dual-ISP configuration 900 of a portion of the image capture system 500 of FIG. 5 in accordance with another embodiment of the disclosure. In particular, FIG. 9 illustrates an example whereby a single ISP is allocated to collect exposure-specific statistics for each individual exposure associated with an HDR-combined stream.

Referring to FIG. 9, the camera sensor module 505 captures exposures 1-3, merges exposures 1-3 into an HDR-combined stream, and then sends the HDR-combined stream and exposures 1-3 to the vision processing system 550. In particular, the HDR-combined stream is delivered to ISP 570_1, while exposures 1-3 are delivered to ISP 570_2. ISP 570_2 performs color-processing on exposures 1-3 to produce statistics 905 (i.e., exposure-specific statistics), which are passed to the processor 565. The processor 565 may convert the exposure-specific statistics into camera sensor calibration parameters (e.g., AWB and/or AE control settings) as calibration feedback to the camera sensor module 505, or may simply forward the exposure-specific statistics back to the camera sensor module 505. While not shown expressly in FIG. 9, other statistics, such as combined stream statistics (e.g., similar to statistics 235), may be produced by ISP 570_1 as well.

Figure 10:
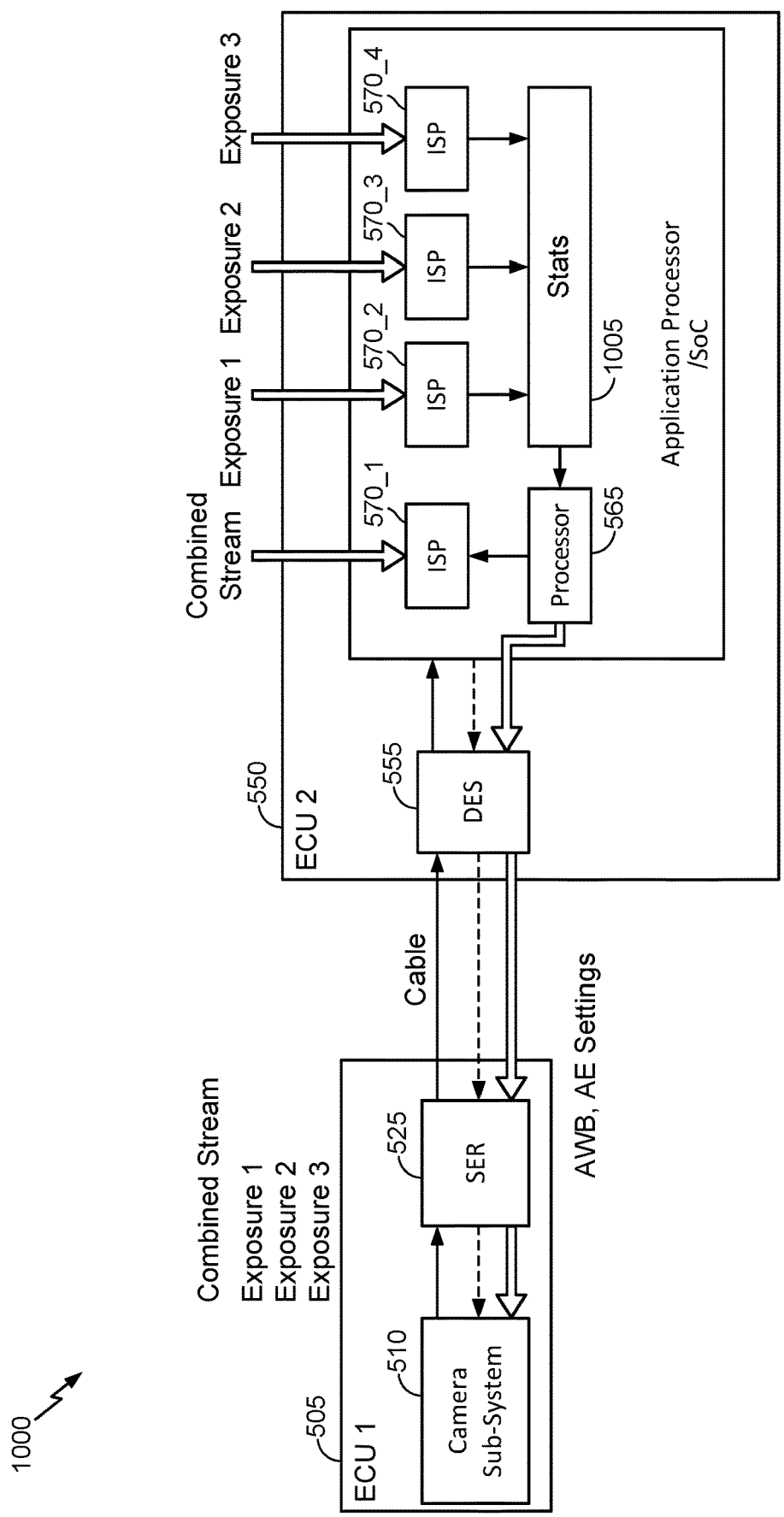
FIG. 10 illustrates a quad-ISP configuration of a portion of the image capture system of FIG. 5 in accordance with another embodiment of the disclosure.

FIG. 10 illustrates a quad-ISP configuration 1000 of a portion of the image capture system 500 of FIG. 5 in accordance with another embodiment of the disclosure. In particular, FIG. 10 illustrates an example whereby a dedicated ISP is allocated to collect exposure-specific statistics for each individual exposure associated with an HDR-combined stream.

Referring to FIG. 10, the camera sensor module 505 captures exposures 1-3, merges exposures 1-3 into an HDR-combined stream, and then sends the HDR-combined stream and exposures 1-3 to the vision processing system 550. In particular, the HDR-combined stream is delivered to ISP 570_1, while exposures 1-3 are delivered to ISP 570_2, ISP 570_3 and ISP 570_4, respectively. ISPs 570_2, 570_3 and 570_4 perform color-processing on exposures 1-3, respectively, to produce statistics 1005, (i.e., exposure-specific statistics), which are then passed to the processor 565. The processor 565 may convert the exposure-specific statistics into camera sensor calibration parameters (e.g., AWB and/or AE control settings) as calibration feedback to the camera sensor module 505, or may simply forward the exposure-specific statistics back to the camera sensor module 505. While not shown expressly in FIG. 10, other statistics, such as combined stream statistics (e.g., similar to statistics 235), may be produced by ISP 570_1 as well.

Referring to FIG. 10, in an embodiment, implementing a 1:1 ratio between ISPs and exposures with respect to color processing for exposure-specific statistic collection may result in little to no memory impact (e.g., 3 ISPs collect statistics which are output to a DDR memory portion of the memory 560, whereas the underlying processed pixel data need not be stored in the DDR memory portion). In other words, in this embodiment, the exposures can be processed to produce relatively small-sized statistic data without requiring the larger exposures to be retained in the DDR memory portion (e.g., by contrast, if real-time processing of the exposures were not possible, the exposures would need to be saved off to the DDR memory portion until processing resources could be allocated for color processing of the exposures for statistics collection).

In a further embodiment, the mapping of ISPs to combined stream color processing and exposure-specific color processing need not be static. Rather, in one embodiment, the ISP mappings may be dynamically allocated for exposure-specific statistic collection as available. In particular, the color processing for the HDR-combined streams may be prioritized over the exposure-specific color processing for statistics collection. So, in the embodiment of FIG. 10 as an example, if two ISPs are required for color processing of HDR-combined streams (e.g., from multiple camera sensor modules, etc.), then only two ISPs may be allocated for exposure-specific statistic collection. Hence, the ISP mappings may change dynamically as the processing load changes. In a high-processing load environment, this may cause some exposures to become expired (e.g., too old to be reliably used for camera sensor calibration), and such exposures can be discarded without statistic collection. In an example, if there are insufficient ISP resources for collecting exposure-specific statistics on all exposures (e.g., a processing resource restriction caused by a high processing requirement for HDR-combined stream processing), the vision processing system 550 may implement an intelligent sampling algorithm so as to distribute the exposure 'skips' (e.g., spread the exposure skips evenly between exposures 1-3 over time, etc.).

Figure 11:
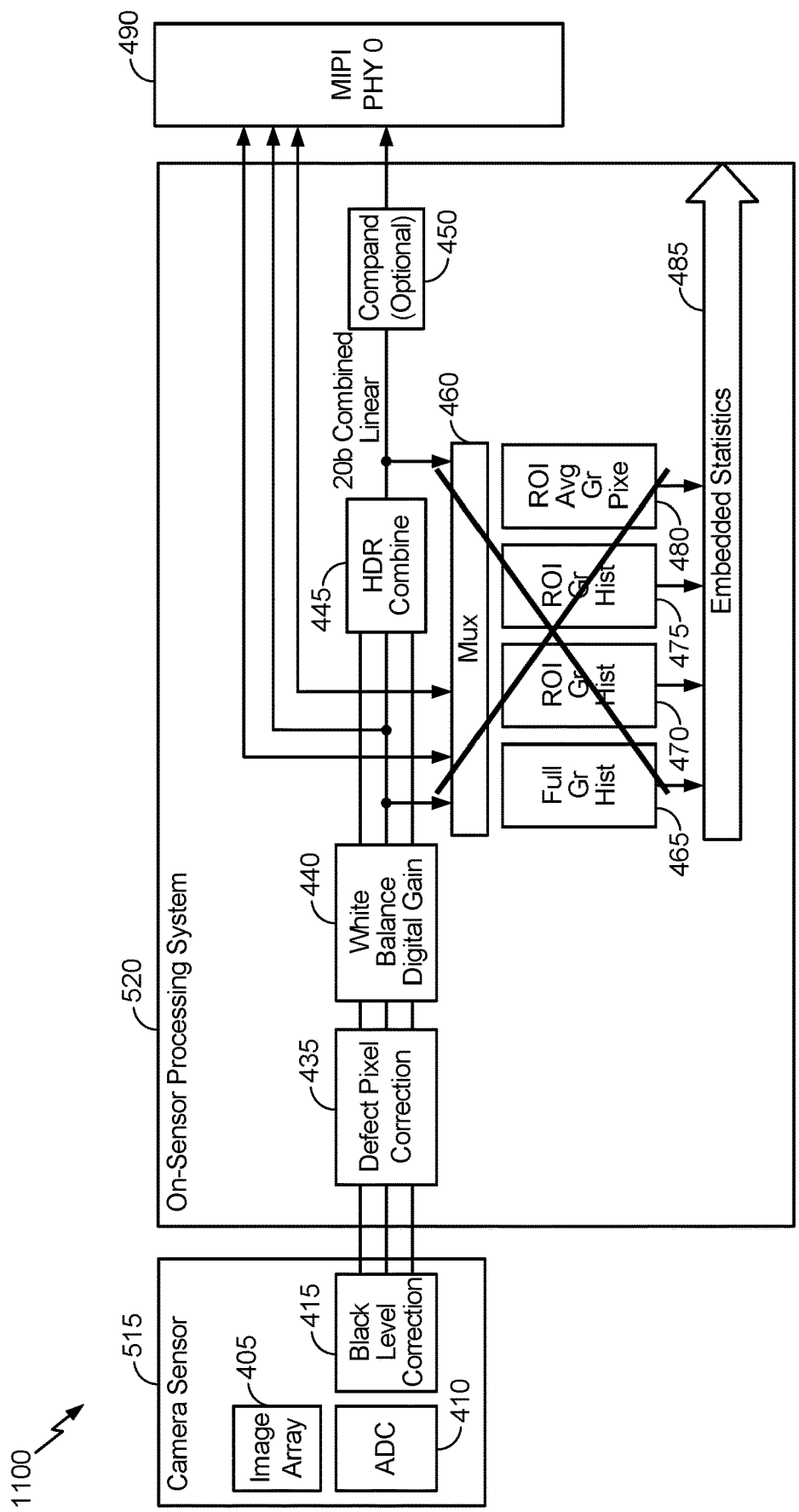
FIG. 11 illustrates an example configuration of a camera sub-system of a camera sensor module in accordance with an embodiment of the disclosure.

FIG. 11 illustrates an example configuration 1100 of the camera sub-system 510 of the camera sensor module 505 of FIG. 5 in accordance with an embodiment of the disclosure. The camera sub-system 510 is arranged similarly to the camera sub-system 215 depicted in FIG. 4 in certain respects. However, the various hardware related to exposure-specific statistic collection which is integrated into the camera sub-system 215 of FIG. 4 is omitted in FIG. 11. In particular, the multiplexer 460, full image histogram module 465, a user configurable ROI histogram module 470 and 475, and user configurable ROI Average Pixel module 480 are omitted, and the exposure-specific statistics 485 are not output by the camera sub-system 510. Once again, this is because the vision processing system 550 (and not the camera sensor module 505) is responsible for collecting the exposure-specific statistics in certain embodiments. Also, the multiplexer 455 of FIG. 4 is also omitted in FIG. 11, because the exposures and HDR-combined stream are both being sent to the vision processing system 550, in contrast to FIG. 4.

As noted above, the camera sub-system 215 depicted in FIG. 4 may be configured to output a 20b linear HDR-combined stream along with one-exposure combined stream statistics. By contrast, the camera sub-system 510 arranged in accordance with the example configuration 1100 of FIG. 11 can output a 20b linear HDR-combined stream as well as three (or four) exposures via a single PHY.

Figure 12:
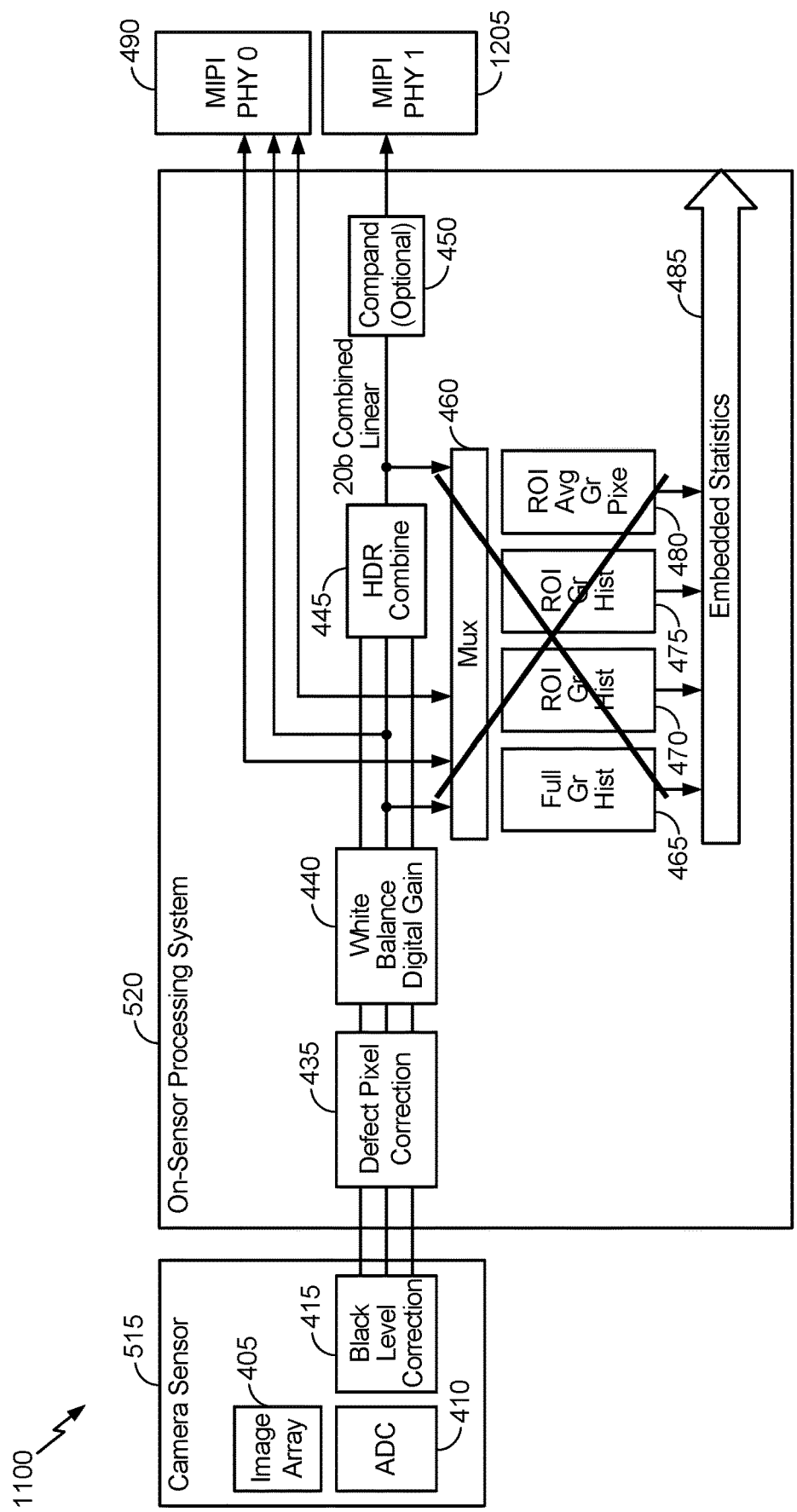
FIG. 12 illustrates an example configuration of a camera sub-system of a camera sensor module in accordance with another embodiment of the disclosure.

FIG. 12 illustrates an example configuration 1200 of the camera sub-system 510 of the camera sensor module 505 of FIG. 5 in accordance with another embodiment of the disclosure. In particular, the camera sub-system configurations 1100 of FIG. 11 and 1200 of FIG. 12 are identical except for the inclusion of a second PHY 1205 (e.g., a MIPI PHY such as a MIPI C-PHY or MIPI D-PHY).

As noted above, the camera sub-system 215 depicted in FIG. 4 may be configured to output a 20b linear HDR-combined stream along with one-exposure combined stream statistics. By contrast, the camera sub-system 510 arranged in accordance with the example configuration 1100 of FIG. 11 can output a 20b linear HDR-combined stream as well as three (or four) exposures via multiple PHYs. For example, larger resolution exposures and/or HDR-combined streams may necessitate the second PHY 1205 in certain implementations.

While various embodiments are described above with respect to automotive camera deployments, it will be appreciated that such embodiments are described for example purposes only, and the embodiments of the disclosure are not limited to automotive camera deployments. For example, the exemplary image capture systems described herein can be implemented in a phone or tablet computer in other embodiments of the disclosure.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a camera sensor module that is communicatively coupled to a vision processing system, comprising:
   capturing, by the camera sensor module, a plurality of exposures;
   performing, by the camera sensor module, high-dynamic range (HDR) combining on the plurality of exposures to produce an HDR-combined stream;
   communicating, by the camera sensor module over a communications link to the vision processing system, (i) the HDR-combined stream, and (ii) the plurality of exposures;
   receiving, from the vision processing system, information related to camera sensor calibration that is based on at least one exposure of the plurality of exposures; and
   calibrating a camera sensor of the camera sensor module based on the information.

2. The method of claim 1, wherein the plurality of exposures includes three or four exposures.

3. The method of claim 1,
   wherein the information comprises exposure-specific statistics for the at least one of the plurality of exposures.

4. The method of claim 1,
   wherein the information comprises camera sensor calibration parameters that are computed at the vision processing system based upon exposure-specific statistics for the at least one of the plurality of exposures.

5. The method of claim 4, wherein the camera sensor calibration parameters include automatic exposure (AE) control settings, automatic white-balance (AWB) control settings, or a combination thereof.

6. The method of claim 1, wherein the camera sensor module and the vision processing system are integrated into a single apparatus.

7. The method of claim 6, wherein the single apparatus is a phone or a tablet computer.

8. The method of claim 1, wherein the camera sensor module and the vision processing system are physically separate from each other.

9. The method of claim 8, wherein the camera sensor module and the vision processing system are part of an image capture system for a vehicle.

10. The method of claim 1, wherein the communications link comprises a single physical layer interface (PHY).

11. The method of claim 1, wherein the communications link comprises multiple physical layer interfaces (PHYs).

12. A method of operating a vision processing system that is communicatively coupled to a camera sensor module, comprising:
   receiving, from the camera sensor module over a communications link, (i) a plurality of exposures captured by the camera sensor module, and (ii) a high-dynamic range (HDR)-combined stream of the plurality of exposures based on HDR-combining performed at the camera sensor module;
   performing, by a first image signal processor (ISP) among a plurality of ISPs, color processing on the HDR-combined stream to produce a color-processed HDR-combined stream for neural network processing, presentation to a human, and/or computer vision processing;
   performing, by at least one other ISP among the plurality of ISPs, color processing to collect exposure-specific statistics on at least one of the plurality of exposures for determining camera calibration data for the camera sensor module; and
   sending, to the camera sensor module, information related to camera sensor calibration that is based on the at least one of the plurality of exposures.

13. The method of claim 12, wherein the color processing performed by the first ISP on the HDR-combined stream includes Bayer RGB to RGB conversion, bad pixel correction, noise filtering, tone mapping, or any combination thereof.

14. The method of claim 12, wherein the at least one other ISP includes a single ISP configured to perform the exposure-specific statistics collection on each of the plurality of exposures.

15. The method of claim 12, wherein the at least one other ISP includes multiple ISPs.

16. The method of claim 15, wherein each ISP among the multiple ISPs is configured to perform the exposure-specific statistics collection on a different one of the plurality of exposures.

17. The method of claim 12, further comprising:
   dynamically modifying an allocation of the at least one other ISP to the color processing for the exposure-specific statistics collection based on a processing requirement associated with HDR-combined stream processing.

18. The method of claim 12, wherein the performing of the color processing to collect the exposure-specific statistics skips statistic collection for one or more of the plurality of exposures.

19. The method of claim 18, wherein the one or more skipped exposures are skipped based on expiration of the one or more skipped exposures, or wherein the one or more skipped exposures are skipped based on a processing resource restriction, or any combination thereof.

20. The method of claim 12, wherein the plurality of exposures includes three or four exposures.

21. The method of claim 12,
   wherein the information comprises the exposure-specific statistics for the at least one of the plurality of exposures for camera sensor calibration.

22. The method of claim 12, further comprising:
   calculating camera sensor calibration parameters for calibration of a camera sensor at the camera sensor module based upon the exposure-specific statistics for the at least one of the plurality of exposures for camera sensor calibration,
   wherein the information comprises the camera sensor calibration parameters.

23. The method of claim 22, wherein the camera sensor calibration parameters include automatic exposure (AE) control settings, automatic white-balance (AWB) control settings, or a combination thereof.

24. The method of claim 12, wherein the camera sensor module and the vision processing system are integrated into a single apparatus.

25. The method of claim 24, wherein the single apparatus is a phone or a tablet computer.

26. The method of claim 12, wherein the camera sensor module and the vision processing system are physically separate from each other.

27. The method of claim 26, wherein the camera sensor module and the vision processing system are part of an image capture system for a vehicle.

28. The method of claim 12, wherein the communications link comprises a single physical layer interface (PHY).

29. The method of claim 12, wherein the communications link comprises multiple physical layer interfaces (PHYs).

30. A camera sensor module that is communicatively coupled to a vision processing system, comprising:
- a camera sensor configured to capture a plurality of exposures;
- an on-sensor processing system configured to perform high-dynamic range (HDR) combining on the plurality of exposures to produce an HDR-combined stream; and
- a communications interface configured to communicate, over a communications link to the vision processing system, (i) the HDR-combined stream, and (ii) the plurality of exposures, and to receive, from the vision processing system, information related to camera sensor calibration that is based on at least one exposure of the plurality of exposures,
- wherein the on-sensor processing system is further configured to calibrate the camera sensor based on the information.

31. The camera sensor module of claim 30,
wherein the information comprises exposure-specific statistics for the at least one of the plurality of exposures.

32. The camera sensor module of claim 30,
wherein the information comprises camera sensor calibration parameters that are computed at the vision processing system based upon exposure-specific statistics for the at least one of the plurality of exposures.

33. The camera sensor module of claim 30,
wherein the camera sensor module and the vision processing system are integrated into a single apparatus, or
wherein the camera sensor module and the vision processing system are physically separate from each other.

34. The camera sensor module of claim 30,
wherein the communications link comprises a single physical layer interface (PHY), or
wherein the communications link comprises multiple PHYs.

35. A vision processing system that is communicatively coupled to a camera sensor module, comprising:
- a communications interface configured to receive, from the camera sensor module over a communications link, (i) a plurality of exposures captured by the camera sensor module, and (ii) a high-dynamic range (HDR)-combined stream of the plurality of exposures based on HDR-combining performed at the camera sensor module;
- a first image signal processor (ISP) among a plurality of ISPs, the first ISP configured to perform color processing on the HDR-combined stream to produce a color-processed HDR-combined stream for neural network processing, presentation to a human, and/or computer vision processing; and
- at least one other ISP among the plurality of ISPs, the at least one other ISP configured to perform color processing to collect exposure-specific statistics on at least one of the plurality of exposures for determining camera calibration data for the camera sensor module,
- wherein the communications interface is further configured to send, to the camera sensor module, information related to camera sensor calibration that is based on the at least one of the plurality of exposures.

36. The vision processing system of claim 35, wherein the color processing performed by the first ISP on the HDR-combined stream includes Bayer RGB to RGB conversion, bad pixel correction, noise filtering, tone mapping, or any combination thereof.

37. The vision processing system of claim 35,
wherein the at least one other ISP includes a single ISP configured to perform the exposure-specific statistics collection on each of the plurality of exposures, or
wherein the at least one other ISP includes multiple ISPs.

38. The vision processing system of claim 35, wherein an allocation of the at least one other ISP to the color processing for the exposure-specific statistics collection is configured to be dynamically modified based on a processing requirement associated with HDR-combined stream processing.

39. The vision processing system of claim 35, wherein the at least one other ISP skips statistic collection for one or more of the plurality of exposures.

40. The vision processing system of claim 35, wherein the information comprises the exposure-specific statistics for the at least one of the plurality of exposures for camera sensor calibration.

41. The vision processing system of claim 35, further comprising:
- at least one processor configured to calculate camera sensor calibration parameters for calibration of a camera sensor at the camera sensor module based upon the exposure-specific statistics for the at least one of the plurality of exposures for camera sensor calibration,
- wherein the information comprises the camera sensor calibration parameters.

42. The vision processing system of claim 35,
wherein the camera sensor module and the vision processing system are integrated into a single apparatus, or
wherein the camera sensor module and the vision processing system are physically separate from each other.

43. The vision processing system of claim 35,
wherein the communications link comprises a single physical layer interface (PHY), or
wherein the communications link comprises multiple PHYs.

* * * * *